US012423230B2

(12) United States Patent
Confalonieri et al.

(10) Patent No.: US 12,423,230 B2
(45) Date of Patent: Sep. 23, 2025

(54) CONTROLLER CACHE ARCHITETURE (71) Applicant: Micron Technology, Inc., Boise, ID (US)

(72) Inventors: Emanuele Confalonieri, Segrate (IT); Nicola Del Gatto, Cassina de' Pecchi (IT)

(73) Assignee: Micron Technology, Inc., Boise, ID (US)

( * ) Notice: Subject to any disclaimer, the term of this patent is extended or adjusted under 35 U.S.C. 154(b) by 244 days.

(21) Appl. No.: 18/202,783

(22) Filed: May 26, 2023

(65) Prior Publication Data
US 2024/0004791 A1   Jan. 4, 2024

Related U.S. Application Data (60) Provisional application No. 63/357,553, filed on Jun. 30, 2022.

(51) Int. Cl.
G06F 12/00         (2006.01)
G06F 12/0802       (2016.01)
G06F 11/10         (2006.01)
G06F 12/0868       (2016.01)
G06F 12/0873       (2016.01)

(52) U.S. Cl.
CPC ...... *G06F 12/0802* (2013.01); *G06F 11/1076* (2013.01); *G06F 12/0868* (2013.01); *G06F 12/0873* (2013.01); *G06F 2212/1024* (2013.01); *G06F 2212/262* (2013.01); *G06F 2212/284* (2013.01); *G06F 2212/312* (2013.01)

(58) Field of Classification Search
None
See application file for complete search history.

(56) References Cited

U.S. PATENT DOCUMENTS

| | | | | |
|---|---|---|---|---|
| 4,928,246 A | * | 5/1990 | Crawley | G01D 1/00 341/142 |
| 2013/0159587 A1 | * | 6/2013 | Nygren | G11C 5/063 710/306 |
| 2022/0137864 A1 | | 5/2022 | Lee | |
| 2022/0147476 A1 | | 5/2022 | Nam et al. | |
| 2022/0156146 A1 | | 5/2022 | Choe et al. | |
| 2023/0236933 A1 | * | 7/2023 | Thirumala | G06F 11/1004 714/6.24 |
| 2023/0409759 A1 | * | 12/2023 | Dolgunov | G06F 21/31 |
| 2024/0126441 A1 | * | 4/2024 | Confalonieri | G06F 3/0611 |

FOREIGN PATENT DOCUMENTS

CN   117331859 A  *  1/2024  .......... G06F 11/1064

* cited by examiner

*Primary Examiner* — Midys Rojas
(74) *Attorney, Agent, or Firm* — Brooks, Cameron & Huebsch, PLLC (57) ABSTRACT

An apparatus can include a plurality of memory devices and a memory controller coupled to the plurality of memory devices via a plurality of memory channels. The plurality of memory channels are organized as a plurality of channel groups, and the memory controller comprises respective independent caches corresponding to the plurality of channel groups.

18 Claims, 6 Drawing Sheets

CONTROLLER CACHE ARCHITETURE

PRIORITY INFORMATION

This application claims the benefit of U.S. Provisional Application No. 63/357,553, filed on Jun. 30, 2022, the contents of which are incorporated herein by reference.

TECHNICAL FIELD

The present disclosure relates generally to semiconductor memory and methods, and more particularly, to apparatuses, systems, and methods for a controller cache architecture.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to a memory controller cache architecture are described. The memory controller can be within a memory system, which can be a memory module, a storage device, or a hybrid of a memory module and a storage device. In various embodiments, the memory controller can include a cache architecture that can be used to reduce access latency associated with accessing the memory devices to which the memory controller is coupled. The memory controller can be coupled to the plurality of memory devices via a plurality of memory channels which can be organized as a plurality of channel groups. The memory controller can comprise respective independent caches corresponding to the plurality of channel groups. In various embodiments, the memory controller is configured to operate the plurality of channel groups as independent respective reliability, availability, and serviceability (RAS) channels.

In some previous approaches, a memory controller of a memory system might include an embedded cache that can provide benefits such as reducing latency in situations in which the system is in a relatively "unloaded" state. An unloaded state can refer to a state in which the memory access request queues (e.g., read and/or write queues) within the memory system are empty or relatively empty. Such reduced latency can be especially beneficial in situations in which the memory device technology has a relatively high access latency. However, providing an embedded cache within the memory controller can also lead to an increase in latency as the workload (e.g., quantity of access requests) increases. By way of example, an increased transfer rate from a host to a memory system can lead to an increased congestion associated with the access queues, which in turn can lead to increased latency associated with operating the cache.

Various embodiments of the present disclosure provide a controller cache architecture that can provide benefits such as improved (e.g., reduced) latency as compared to prior approaches. A number of embodiments include a memory controller having a plurality of caches that can be operated independently to service separate non-overlapping physical address ranges. Cache architectures described herein can be effectively and efficiently operated over multiple host interface speeds and transfer rates.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 310 in FIG. 3. Analogous elements within a Figure may be referenced with a hyphen and extra numeral or letter. See, for example, elements 130-1, 130-2, 130-N in FIG. 1. Such analogous elements may be generally referenced without the hyphen and extra numeral or letter. For example, elements 130-1, 130-2, 130-N may be collectively referenced as 130.

As used herein, the designators "M," "N," and "X," particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
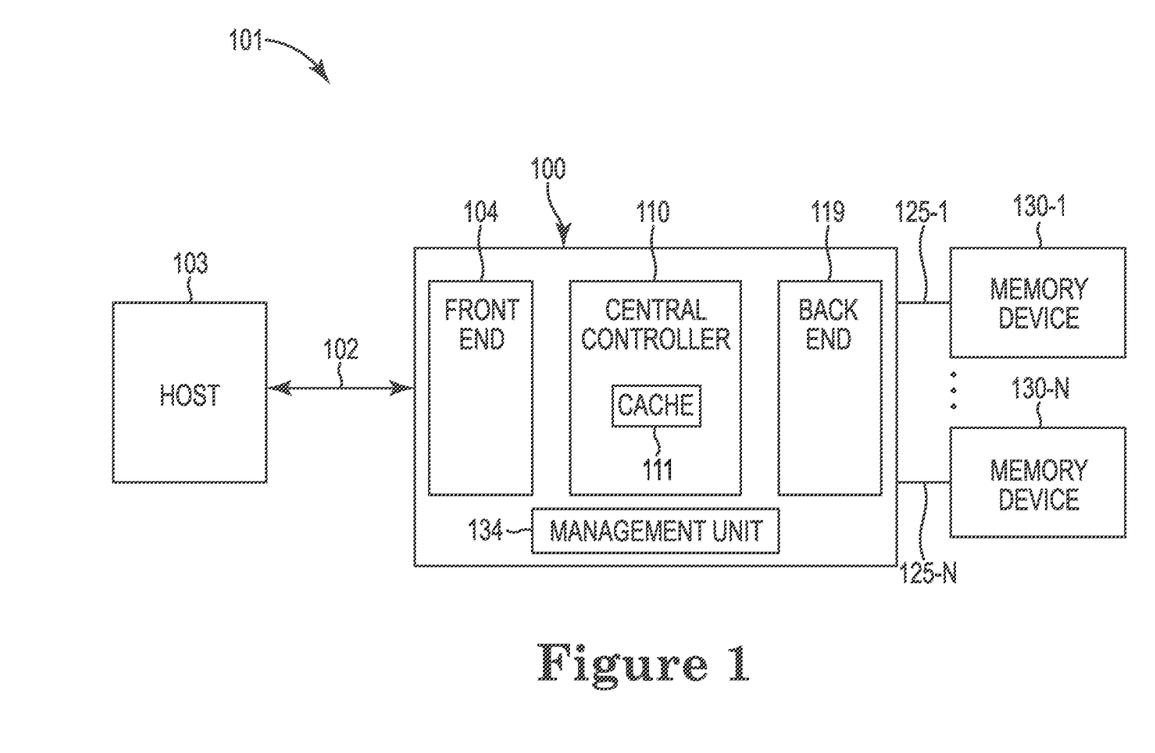
FIG. 1 is a block diagram of a computing system including a memory controller in accordance with a number of embodiments of the present disclosure.

FIG. 1 is a block diagram of a computing system 101 including a memory controller 100 in accordance with a number of embodiments of the present disclosure. The memory controller 100 includes a front end portion 104, a central controller portion 110, and a back end portion 119. The computing system 101 includes a host 103 and memory devices 130-1, . . . , 130-N coupled to the memory controller 100. The computing system 101 can be, for example, a high performance computing (HPC) data center among various other types of computing systems (e.g., servers, desktop computers, laptop computers, mobile devices, etc.).

Although not shown in FIG. 1, the front end portion 104 can include a physical layer (PHY) and a front end controller for interfacing with the host 103 over a bus 102, which can include a number of input/output (I/O) lanes. The bus 102 can include various combinations of data, address, and control busses, which can be separate busses or one or more combined busses. In at least one embodiment, the interface between the memory controller 100 and the host 103 can be a peripheral component interconnect express (PCIe) physical and electrical interface operated according to a compute express link (CXL) protocol. As non-limiting examples, the bus 102 can be a PCIe 5.0 interface operated in accordance with a CXL 2.0 specification or a PCIe 6.0 interface operated in accordance with a CXL 3.0 specification.

CXL is a high-speed central processing unit (CPU)-to-device and CPU-to-memory interconnect designed to accelerate next-generation data center performance. CXL technology maintains memory coherency between the CPU memory space and memory on attached devices such as accelerators, memory buffers, and smart I/O devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. CXL provides protocols with I/O semantics similar to PCIe (e.g., CXL.io), caching protocol semantics (e.g., CXL.cache), and memory access semantics (CXL.mem).

The central controller 110 can be responsible for controlling various operations associated with executing memory access requests (e.g., read commands and write commands) from the host 103. For example, as described further below, the central controller 110 can include a cache 111, which can be implemented as a plurality of independent caches, and various error circuitry (e.g., error detection and/or error correction circuitry) capable of generating error detection and/or error correction data for providing data reliability among other RAS functionality in association with writing data to and/or reading data from the memory devices 130. As described further herein, such error detection and/or correction circuitry can include cyclic redundancy check (CRC) circuitry, error correcting code (ECC) circuitry, redundant array of independent disks (RAID) circuitry, and/or "chip kill" circuitry, for example.

The back end portion 119 can include a number of memory channel controllers (e.g., media controllers) and a physical (PHY) layer that couples the memory controller 100 to the memory devices 130. As used herein, the term "PHY layer" generally refers to the physical layer in the Open Systems Interconnection (OSI) model of a computing system. The PHY layer may be the first (e.g., lowest) layer of the OSI model and can be used to transfer data over a physical data transmission medium. In various embodiments, the physical data transmission medium includes memory channels 125-1, . . . , 125-N. The memory channels 125 can be, for example, 16-bit channels each coupled to 16-bit (e.g., x16) devices, to two 8-bit (x8) devices; although embodiments are not limited to a particular back end interface. As another example, the channels 125 can each also include a two pin data mask inversion (DMI) bus, among other possible bus configurations. The back end portion 119 can exchange data (e.g., user data and error detection and/or correction data) with the memory devices 130 via the physical pins corresponding to the respective memory channels 125. As described further herein, in a number of embodiments, the memory channels 125 can be organized as a number of channel groups, with the memory channels of each group being accessed together in association with executing various memory access operations and/or error detection and/or correction operations.

The memory devices 130 can be, for example, dynamic random access memory (DRAM) devices operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). However, embodiments are not limited to a particular type of memory device 130. For example, the memory devices 130 can be FeRAM devices.

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
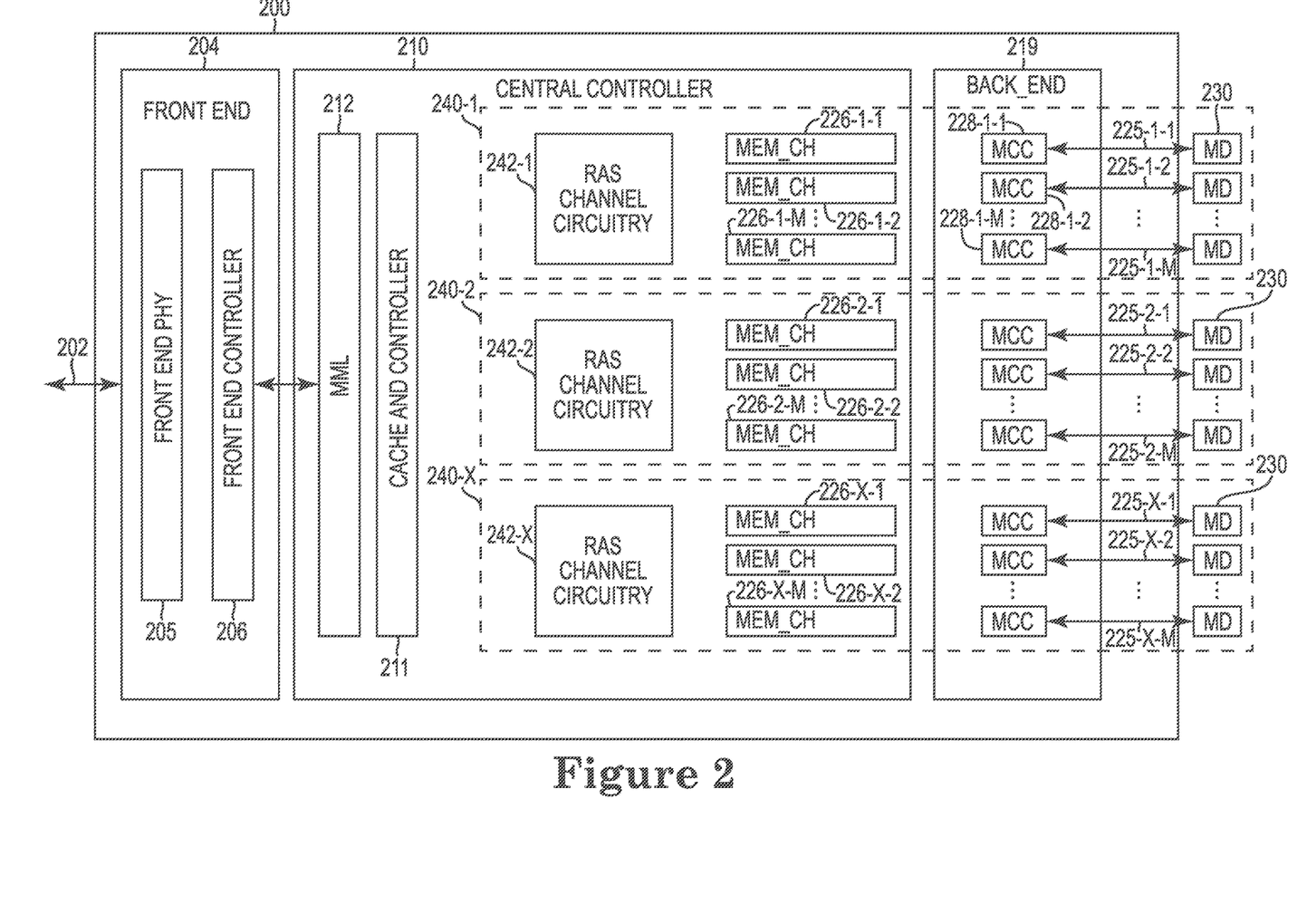
FIG. 2 is a block diagram of a memory controller coupled to a plurality of memory devices.

FIG. 2 is a block diagram of a memory controller 200 coupled to a plurality of memory devices 230. As shown in FIG. 2, the controller 200 includes a front end portion 204, a central portion 210, and a back end portion 219. The controller 200 can be a controller such as controller 100 described in FIG. 1.

The front end portion 204 includes a front end PHY 205 for interfacing with a host via communication link 202, which can be a CXL link, for example. The front end 204 includes a front end controller 206 to manage the interface and communicate with the central controller 210. In embodiments in which the link 202 is a CXL link, the front end controller 206 is configured to receive (e.g., from a host) memory access requests, according to a CXL protocol, directed at the memory devices 230.

The controller 200 is coupled to the memory devices 230 via a number of memory channels 225. In this example, the memory channels 225 are organized as a number of channel groups 240-1, 240-2, . . . , 240-X. In this example, each channel group 240 comprises "M" memory channels 225. For instance, channel group 240-1 comprises memory channels 225-1-1, 225-1-2, . . . , 225-1-M, channel group 240-2 comprises memory channels 225-2-1, 225-2-2, . . . , 225-2-M, and channel group 240-X comprises memory channels 225-X-1, 225-X-2, . . . , 225-X-M. Although each channel group is shown as comprising a same quantity of memory channels 225, embodiments are not so limited.

In this example, the back end portion 219 of controller 200 includes a plurality of memory channel controllers (MCC) 228 for interfacing with memory devices 230 corresponding to the respective memory channels 225. As shown in FIG. 2, the memory channel controllers 228-1-1, 228-1-2, . . . , 228-1-M corresponding to channel group 240-1 are coupled to the memory devices 230 via respective channels 225-1-1, 225-2-2, . . . , 225-1-M. Although not shown in FIG. 2, the back end 219 includes a PHY memory interface for coupling to the memory devices 230.

The respective channels 225 of the channel groups 240-1, 240-2, . . . , 240-X are operated together for purposes of one or more RAS schemes. Accordingly, the channel groups 240 may be referred to as "RAS channels." In this example, the channel groups 240-1, 240-2, . . . , 240-X include respective error circuitry (RAS CHANNEL CIRCUITRY) 242-1, 242-2, . . . , 242-X. The error circuitry 242 can include various circuitry for error detection and/or error correction, which can include data recovery. The error circuitry 242 can also include CRC circuitry, ECC, circuitry, RAID circuitry and/or chip kill circuitry, including various combinations thereof. The channel groups 240-1, 240-2, . . . , 240-X can be operated independently by the central controller 210 such that memory access requests and/or error operations can be separately (and concurrently) performed on the memory devices 230 corresponding to the respective channel groups 240.

The term "chip kill" generally refers to a form of error correction that protects memory systems (e.g., the memory system 101 shown in FIG. 1) from any single memory device 230 (chip) failure as well as multi-bit error from any portion of a single memory chip. Chip kill circuitry can increase the stability of the data and correct errors in the data with a desired chip kill protection collectively across subsets of the memory devices 230 (e.g., subsets corresponding to respective channel groups 240).

An example chip kill implementation for channel groups 240 comprising eleven memory channels 225 (e.g., "M"=11) corresponding to a bus width of 176 bits (16 bits/channel×11 channels) can include writing data to memory devices 230 of eight of the eleven memory channels 225 and parity data to memory devices 230 of three of the eleven memory channels 225. Four codewords can be written, each composed of eleven four-bit symbols, with each symbol belonging to a different channel/device. A first codeword can comprise the first four-bit symbol of each memory device 230, a second codeword can comprise the second four-bit symbol of each memory device 230, a third codeword can comprise the third four-bit symbol of each memory device 230, and a fourth codeword can comprise the fourth four-bit symbol of each memory device 230.

The three parity symbols can allow the chip kill circuitry (e.g., 242) to correct up to one symbol error in each codeword and to detect up to two symbol errors. If instead of adding three parity symbols, only two parity symbols are added, the chip kill circuitry can correct up to one symbol error but only detect one symbol error. In various embodiments, the data symbols and the parity symbols can be written or read concurrently from memory devices of the eleven channels (e.g., 225-1-1 to 225-1-11). If every bit symbol in a die fails, only the bit symbols from that memory device 230 in the codeword will fail. This allows memory contents to be reconstructed despite the complete failure of one memory device 2230. The aforementioned chip kill operation is considered to be "on-the-fly correction" because the data is corrected without impacting performance by performing a repair operation. Embodiments are not limited to the particular example chip kill operation described above. In contrast to chip kill operations that may not involve a repair operation, various RAID approaches are considered to be "check-and-recover correction" because a repair process is initiated to recover data subject to an error. For example, if an error in a symbol of a RAID stripe is determined to be uncorrectable, then the corresponding data can be recovered/reconstructed by reading the remaining user data of the stripe and XORing with the stripe's corresponding parity data.

As shown in FIG. 2, each of the channel groups 240 can include memory channel datapath circuitry (MEM CH) 226 associated with the corresponding memory channels 225 of a particular channel group 240. For example, channel group 240-1 includes memory channel datapath circuitry 226-1-1, 226-1-2, . . . , 226-1-M corresponding to respective channels 225-1-1, 225-1-2, . . . , 225-1-M. Similarly, channel group 240-2 includes memory channel datapath circuitry 226-2-1, 226-2-2, . . . , 226-2-M corresponding to respective channels 225-2-1, 225-2-2, . . . , 225-2-M, and channel group 240-X includes memory channel datapath circuitry 226-X-1, 226-X-2, 226-X-M corresponding to respective channels 225-X-1, 225-X-2, . . . , 225-X-M. The datapath circuitry 226 can include error circuitry corresponding to error detection or error correction on a particular memory channel 225. For instance, the datapath circuitry 226 might include CRC circuitry or ECC circuitry. That is, in contrast to the error circuitry 242, which can be associated with multiple channels 225 within the channel group 240, the error circuitry of datapath circuitry 226 can be associated with or dedicated to a particular memory channel 225.

As shown in FIG. 2, the central controller 210 can include a media management layer (MML) 212 that can be used to translate memory access requests in accordance with a particular protocol (e.g., CXL compliant requests) into a protocol compliant with the particular memory controller 200 and/or particular type of memory media (e.g., memory devices 230). The central controller 210 can also include a cache 211, which can include an associated cache controller. The cache 211 can be used, for example, to temporarily store data frequently accessed (e.g., by a host).

The cache 211 can add latency to memory operations depending on various factors such as transaction load, hit rate, etc. For instance, the cache 211 might operate efficiently at a particular rate of transfer (e.g., 32 GT/s) from the host; however, the cache 211 can become a bottleneck if the transfer rate from host increases (e.g., to 64 GT/s) such that a clock speed corresponding to the cache 211 is not able to keep up with the increased transfer rate. As another example, memory access request queues (not shown) in the front end 204 of controller 200 and/or cache lookup request queues (not shown) in the central controller 210 may become full or overloaded if the transfer rate between the front end 204 and the host (e.g., the host transfer rate) increases with respect to the transfer rate between the front end 204 and the central controller 210.

Figure 4:
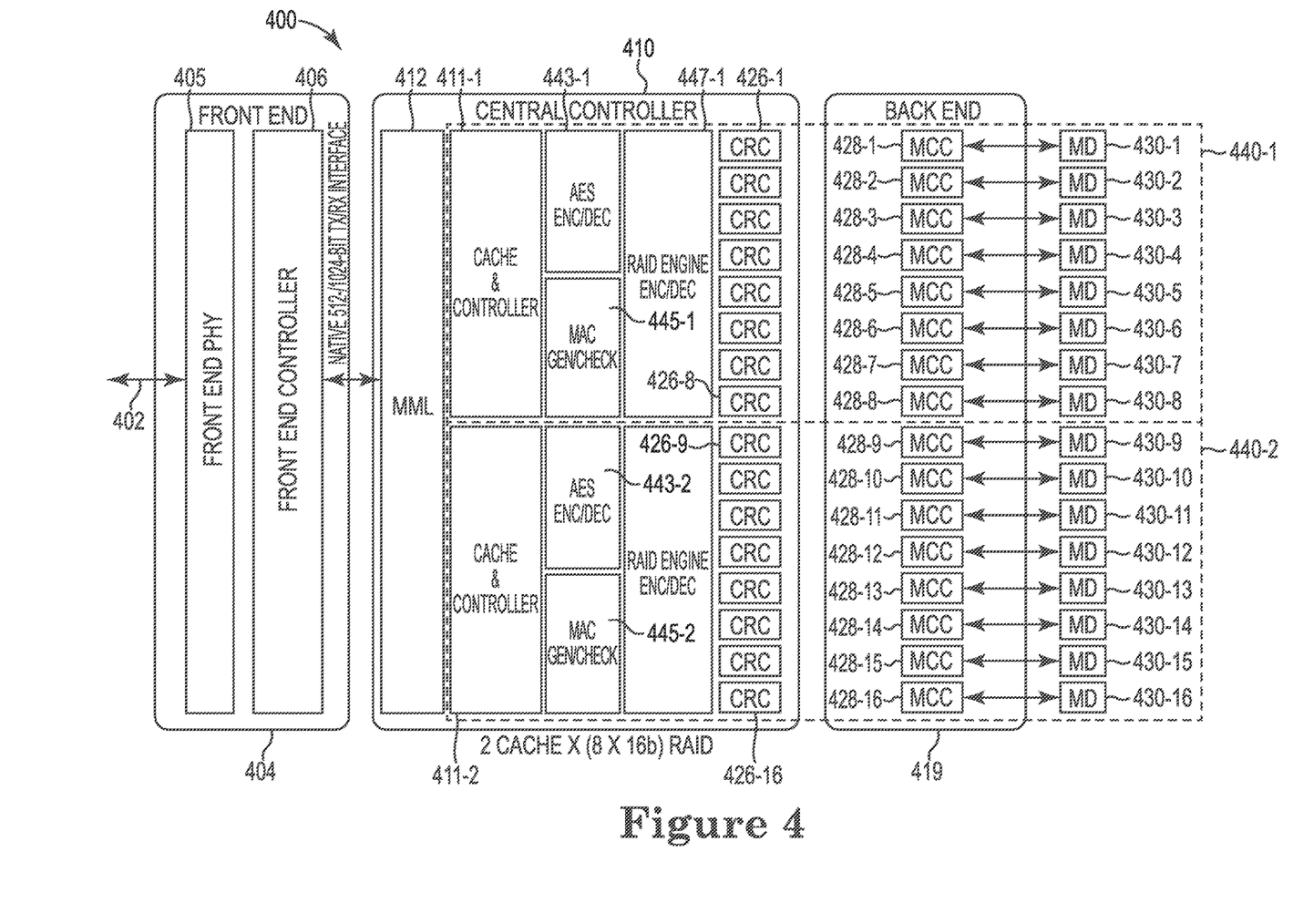
FIG. 4 is a block diagram of a memory controller having a cache architecture in accordance with a number of embodiments of the present disclosure.
Figure 5:
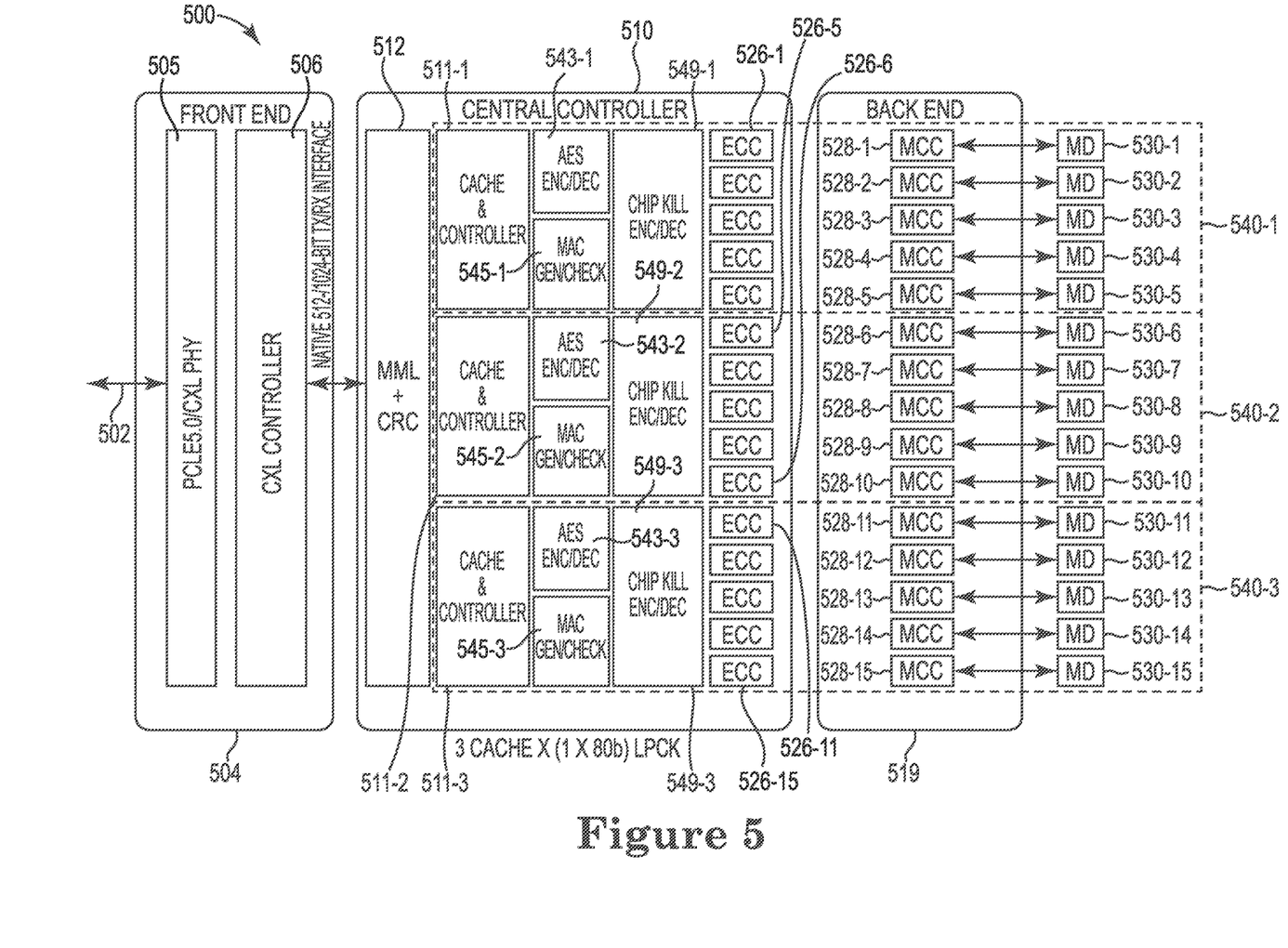
FIG. 5 is a block diagram of a memory controller having a cache architecture in accordance with a number of embodiments of the present disclosure.

As described further below, various embodiments of the present disclosure can provide a cache architecture that can reduce the adverse effects (e.g., on latency) that can be caused by an increased host transfer rate, for example. For instance, as shown in FIGS. 3, 4, and 5, various embodiments can include providing multiple separate caches (e.g., per channel group) that can be independently operated (e.g., by a central controller) in order to service more memory access requests per unit time than a single cache (e.g., multiple cache lookup operations can be performed in parallel on the caches of the respective channel groups).

Figure 3:
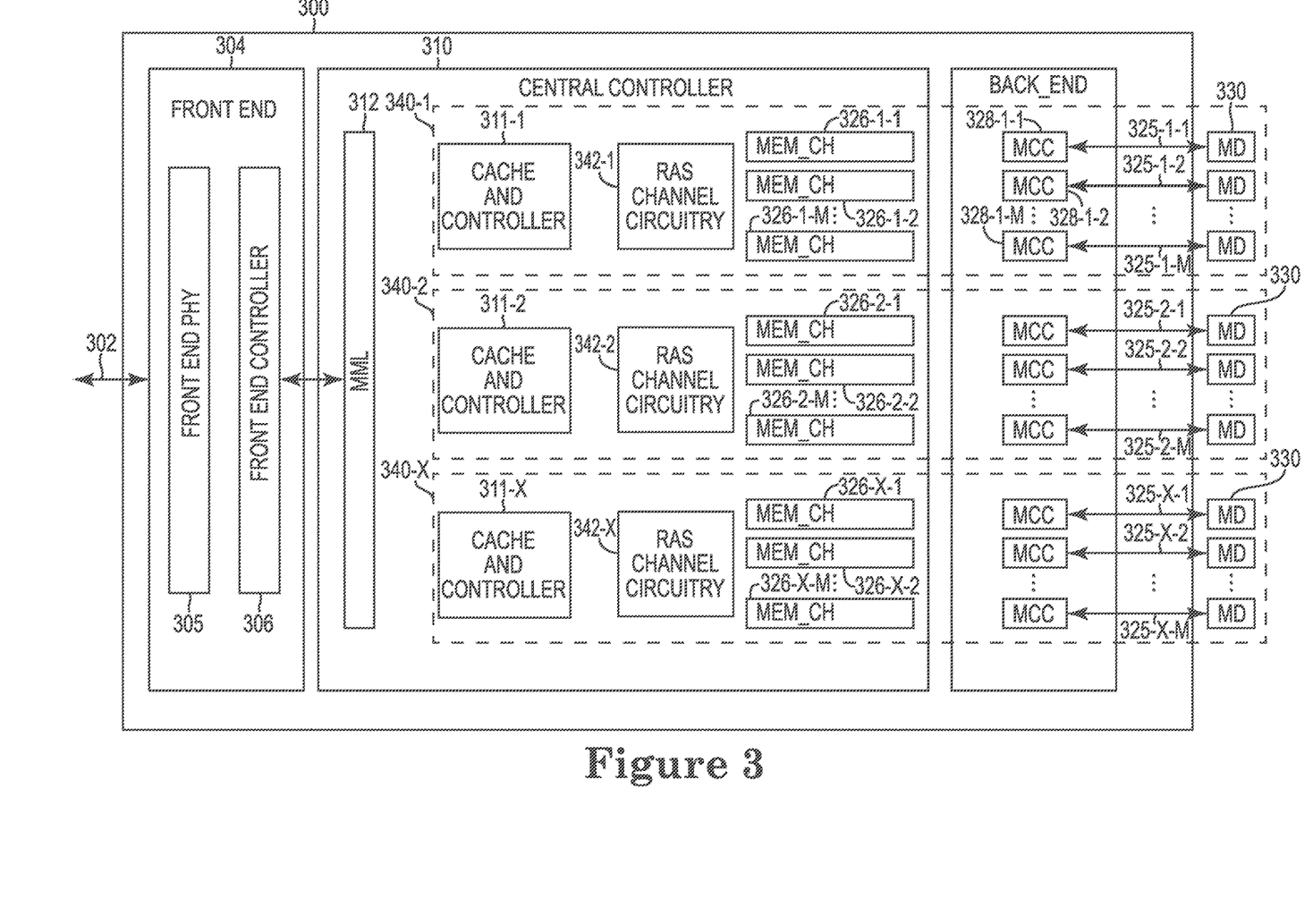
FIG. 3 is a block diagram of a memory controller having a cache architecture in accordance with a number of embodiments of the present disclosure.

FIG. 3 is a block diagram of a memory controller 300 having a cache architecture in accordance with a number of embodiments of the present disclosure. The memory controller 300 is analogous to the memory controller 200 shown in FIG. 2 with the exception that the cache 211 in FIG. 2 is replaced with multiple separate and independently operated caches 311-1, 311-2, ..., 311-X corresponding to respective channel groups (e.g., RAS channels) 340-1, 340-2, ..., 340-X.

Accordingly, as shown in FIG. 3, the controller 300 includes a front end portion 304, a central portion 310, and a back end portion 319. The front end portion 304 includes a front end PHY 305 for interfacing with a host via communication link 302, which can be a CXL link, for example. The front end 304 includes a front end controller 306 to manage the interface and communicate with the central controller 310. In embodiments in which the link 302 is a CXL link, the front end controller 306 is configured to receive (e.g., from a host) memory access requests, according to a CXL protocol, directed at the memory devices 330.

The controller 200 is coupled to the memory devices 330 via a number of memory channels 325. In this example, the memory channels 325 are organized as a number of channel groups 340-1, 340-2, ..., 340-X. In this example, each channel group 340 comprises "M" memory channels 325. For instance, channel group 340-1 comprises memory channels 325-1-1, 325-1-2, ..., 325-1-M, channel group 240-2 comprises memory channels 325-2-1, 325-2-2, ..., 325-2-M, and channel group 340-X comprises memory channels 325-X-1, 325-X-2, ..., 325-X-M.

The back end portion 319 of controller 300 includes a plurality of memory channel controllers (MCC) 328 for interfacing with memory devices 330 corresponding to the respective memory channels 325. As shown in FIG. 3, the memory channel controllers 328-1-1, 328-1-2, ..., 328-1-M corresponding to channel group 340-1 are coupled to the memory devices 330 via respective channels 325-1-1, 325-2-2, ..., 325-1-M. Although not shown in FIG. 3, the back end 319 includes a PHY memory interface for coupling to the memory devices 330.

The respective channels 325 of the channel groups 340-1, 340-2, ..., 340-X are operated together for purposes of one or more RAS schemes. Accordingly, the channel groups 340 may be referred to as "RAS channels." In this example, the channel groups 340-1, 340-2, ..., 340-X include respective error circuitry (RAS CHANNEL CIRCUITRY) 342-1, 342-2, ..., 342-X. The error circuitry 342 can include various circuitry for error detection and/or error correction, which can include data recovery. The error circuitry 342 can also include CRC circuitry, ECC, circuitry, RAID circuitry and/or chip kill circuitry, including various combinations thereof. The channel groups 340-1, 340-2, ..., 340-X can be operated independently by the central controller 310 such that memory access requests and/or error operations can be separately (and concurrently) performed on the memory devices 330 corresponding to the respective channel groups 340.

As shown in FIG. 3, each of the channel groups 340 can include memory channel datapath circuitry (MEM CH) 326 associated with the corresponding memory channels 325 of a particular channel group 340. For example, channel group 340-1 includes memory channel datapath circuitry 326-1-1, 326-1-2, ..., 326-1-M corresponding to respective channels 325-1-1, 325-1-2, ..., 325-1-M. Similarly, channel group 340-2 includes memory channel datapath circuitry 326-2-1, 326-2-2, ..., 326-2-M corresponding to respective channels 325-2-1, 325-2-2, ..., 325-2-M, and channel group 340-X includes memory channel datapath circuitry 326-X-1, 326-X-2, 326-X-M corresponding to respective channels 325-X-1, 325-X-2, ..., 325-X-M. The datapath circuitry 326 can include error circuitry corresponding to error detection or error correction on a particular memory channel 325. For instance, the datapath circuitry 326 might include CRC circuitry or ECC circuitry. That is, in contrast to the error circuitry 342, which can be associated with multiple channels 325 within the channel group 340, the error circuitry of datapath circuitry 326 can be associated with or dedicated to a particular memory channel 325.

As shown in FIG. 3, the central controller 310 can include a media management layer (MML) 312 that can be used to translate memory access requests in accordance with a particular protocol (e.g., CXL compliant requests) into a protocol compliant with the particular memory controller 300 and/or particular type of memory media (e.g., memory devices 330).

The central controller 310 includes a plurality of caches 311-1, 311-2, ..., 311-X corresponding to the respective channel groups 340-1, 340-2, ..., 340-X. The caches 311 include associated cache controllers for independently operating the respective caches. The caches 311-1, 311-2, ..., 311-X can be, for example, set-associative caches. In various embodiments, the physical address regions associated with (e.g., assigned to) the caches 311 do not overlap, which can ensure that all of the "X" caches 311 can concurrently access the memory devices 330.

A number of embodiments can include receiving a memory access request (e.g., a read or write request) at the memory controller 300 from a host (e.g., host 103 shown in FIG. 1). The controller 300 can execute the memory access request by determining to which one of the caches 311 an address corresponding to the access requests corresponds. The controller can then execute the access request using the corresponding cache (e.g., 311-1), RAS channel circuitry (e.g., 342-1), memory channel datapath circuitry (e.g., 326-1-1, 326-1-2, ..., 326-1-M) and back end memory channel controllers (e.g., 328-1-2, 328-1-2, ..., 328-1-M) to access the corresponding memory devices 330 via the corresponding memory channels (e.g., 325-1-1, 325-1-2, ..., 325-1-M).

FIG. 4 is a block diagram of a memory controller 400 having a cache architecture in accordance with a number of embodiments of the present disclosure. The memory controller 400 illustrates an example implementation of a particular error detection/correction scheme. Accordingly, the memory controller 400 is similar to the memory controller 300 described in FIG. 3. The memory controller 400 is coupled to memory devices 430-1 to 430-16 via respective memory channels (e.g., channels 325 shown in FIG. 3). In this example, the memory channels are organized into two channel groups 440-1, which includes the memory channels corresponding to memory devices 430-1 to 430-8, and 440-2, which includes the memory channels corresponding to memory devices 430-9 to 430-16.

As illustrated in FIG. 4, each of the channel groups 440-1 and 440-2 has a designated separate cache (and associated cache controller) 411-1 and 411-2. As described further below, the channel groups 440-1 and 440-2 include respective corresponding error circuitry components 443-1 and 443-2, 445-1 and 445-2, 447-1 and 447-2. The channel groups 440-1 and 440-2 also include respective channel datapath error circuitry. In this example, the channel datapath circuitry comprise CRC circuitry 426-1 to 426-8 corresponding to channel group 440-1 and CRC circuitry 426-9 to 426-16 corresponding to channel group 440-2.

The example memory controller 400 illustrated in FIG. 4 is configured to implement a RAID error recovery scheme separately across the two channel groups 440-1 and 440-2. For example, RAID stripes can be stored across memory devices 430-1 to 430-8, and separate RAID stripes can be stored across the memory devices 430-9 to 430-16.

In this example, each channel group 440-1 and 440-2 includes a respective security encryption component 443-1 and 443-2 (AES ENC/DEC), which can be, for example, an advanced encryption standard (AES) encoder/decoder used to provide an added level of security via encryption of data stored to the memory devices 430. Each channel group 440-1 and 440-2 can also include a respective authenticity components 445-1 and 445-2 (MAC GEN/CHECK), which can be for example a media access control (MAC) generator and checker used for confirming data authenticity. In various embodiments, the central controller 410 may include a CRC component (e.g., as part of the MML 412) configured to generate a check value prior writing data to the caches 411-1 and 411-2.

The channel groups 440-1 and 440-2 also include respective RAID engines 447-1 and 447-2 configured to generate and/or update RAID parity data in association with executing a memory access request. As shown in FIG. 4, each channel group 440-1 and 440-2 includes CRC components 426 to generate check values for RAID encoded data prior to being written to the memory devices 430 and to be checked when reading data from the memory devices 430. If the CRC check fails, the RAID engines 447-1 and 447-2 can read the other devices 430 corresponding to the stripe to recover the data.

Various components in FIG. 4 are not described in detail since they are analogous to similar components described in FIG. 3. For example, such components include 402, 404, 405, 406, and 419, which are analogous to corresponding components in FIG. 3.

FIG. 5 is a block diagram of a memory controller 500 having a cache architecture in accordance with a number of embodiments of the present disclosure. The memory controller 500 illustrates an example implementation of a particular error detection/correction scheme. Accordingly, the memory controller 500 is similar to the memory controller 300 described in FIG. 3. The memory controller 500 is coupled to memory devices 530-1 to 530-16 via respective memory channels (e.g., channels 325 shown in FIG. 3). In this example, the memory channels are organized into three channel groups 540-1, 540-2 and 540-3. Channel group 540-1 includes the memory channels corresponding to memory devices 530-1 to 530-5, channel group 540-2 includes the memory channels corresponding to memory devices 530-6 to 530-10, and channel group 530-3 includes the memory channels corresponding to memory devices 530-11 to 530-15.

As illustrated in FIG. 5, each of the channel groups 540-1, 540-2, and 540-3 has a designated separate cache (and associated cache controller) 511-1, 511-2, and 511-3. As described further below, the channel groups 540-1, 540-2, and 540-3 include respective corresponding error circuitry components 543-1, 543-2, and 543-3, 545-1, 545-2, and 545-3, and 549-1, 549-2, and 549-3. The channel groups 540-1, 540-2, and 540-3 also include respective channel datapath error circuitry. In this example, the channel datapath circuitry comprise ECC circuitry 526-1 to 526-5 corresponding to channel group 540-1, ECC circuitry 526-1 to 526-5 corresponding to channel group 540-1, ECC circuitry 526-6 to 526-10 corresponding to channel group 540-2, and ECC circuitry 526-11 to 526-15 corresponding to channel group 540-3.

The example memory controller 500 illustrated in FIG. 5 is configured to implement an "on-the-fly" chip kill error correction scheme separately and independently across the three channel groups 540-1, 540-2, and 540-3. For example, considering a 16-bit channel width, separate 80-bit ECC codewords (16 bits×5 channels) can be written to the memory devices 530-1 to 530-5, 530-6 to 530-10, and 530-11 to 530-15).

Similar to the example provided in FIG. 4, in this example, each channel group 540-1, 540-2, and 540-3 includes a respective security encryption component 543-1, 543-2, and 543-3 (AES ENC/DEC), which can be, for example, an advanced encryption standard (AES) encoder/decoder used to provide an added level of security via encryption of data stored to the memory devices 530. Each channel group 540-1, 540-2, and 540-3 can also include a respective authenticity components 545-1, 545-2, and 545-3 (MAC GEN/CHECK), which can be for example a media access control (MAC) generator and checker used for confirming data authenticity. In various embodiments, the central controller 510 may include a CRC component (e.g., as part of the MML 512) configured to generate a check value prior writing data to the caches 511-1, 511-2, and 511-3.

The channel groups 540-1, 540-2, and 540-3 also include respective chip kill engines 549-1, 549-2, and 549-3 configured to encode and decode ECC codewords in association with memory access requests (e.g., from a host). As shown in FIG. 5, each channel group 540-1, 540-2, and 540-3 includes ECC components 526 to generate ECC data for the ECC codewords.

Various components in FIG. 5 are not described in detail since they are analogous to similar components described in FIG. 3 and FIG. 4. For example, such components include 502, 504, 505, 506, and 519, which are analogous to corresponding components in FIG. 3.

Figure 6:
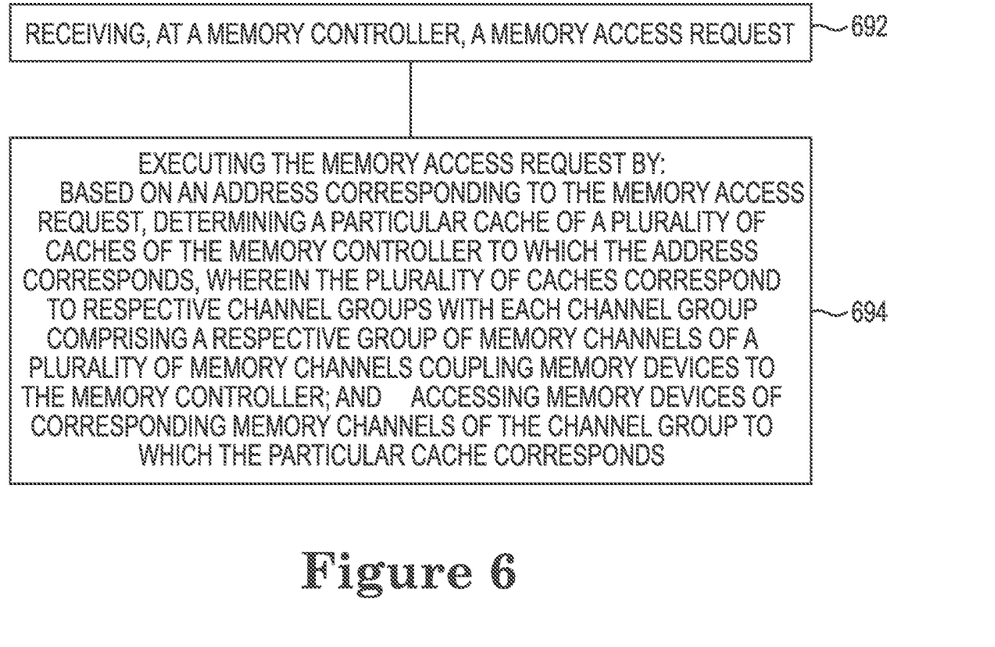
FIG. 6 is a flow diagram of a method for operating a memory controller having a cache architecture in accordance with a number of embodiments of the present disclosure.

FIG. 6 is a flow diagram of a method for operating a memory controller having a cache architecture in accordance with a number of embodiments of the present disclosure. The methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 692, the method includes receiving, at a memory controller (e.g., memory controller 100, 200, 300, 400, 500), a memory access request (e.g., a read access request or a write access request). At block 694, the method includes executing the memory access request. The memory access request can be executed by, based on an address corresponding to the memory access request, determining a particular cache of a plurality of caches (e.g., caches 311-1, 311-2, . . . , 311-X; 411-1, 411-2) of the memory controller to which the address corresponds. The plurality of caches can correspond to respective channel groups (e.g., 240-1, 240-2, . . . , 240-X; 340-1, 340-2, . . . , 340-X; 440-1, 440-2; 540-1, 540-2, 540-3) with each channel group comprising a respective group of memory channels coupling memory devices to the memory controller. The method can include accessing memory devices (e.g., 230, 430, etc.) of corresponding memory channels of the channel group to which the particular cache corresponds.

The plurality of caches correspond to respective channel groups with each channel group comprising a respective group of memory channels of a plurality of memory channels coupling memory devices to the memory controller. In this manner, the multiple caches can be operated (e.g., accessed) in parallel thereby reducing latency that can occur if only a single cache is used to service all the memory channels.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a plurality of memory devices; and
 a memory controller coupled to the plurality of memory devices via a plurality of memory channels;
 wherein the plurality of memory channels are organized as a plurality of channel groups, the plurality of memory channels further comprising:
  a first channel group including first error correction circuitry configured to correct and/or detect errors in data received via a first quantity of the plurality of memory channels; and
  a second channel group including second error correction circuitry that is operated independently of the first error correction circuitry, the second error correction circuitry configured to correct and/or detect errors in data received via a second quantity of the plurality of memory channels; and
 wherein the memory controller comprises respective independent caches corresponding to the plurality of channel groups.

2. The apparatus of claim 1, wherein the:
 first error correction circuitry is operated, by the memory controller, in association with accessing memory devices corresponding to the first quantity of the plurality of memory channels; and
 the second error correction circuitry is operated, by the memory controller and independently from the first error correction circuitry, in association with accessing memory devices corresponding to the second quantity of the plurality of memory channels.

3. The apparatus of claim 2, wherein the plurality of channel groups comprises:
 a third channel group comprising a third quantity of the plurality of memory channels; and
 wherein the third channel group includes third error correction circuitry that is operated, by the memory controller and independently from the first error correction circuitry and the second error correction circuitry, in association with accessing memory devices corresponding to the third quantity of the plurality of memory channels.

4. The apparatus of claim 1, wherein the memory controller comprises a front end portion that includes a compute express link (CXL) controller coupled to a host via a CXL link.

5. The apparatus of claim 1, wherein the memory controller comprises at least three independent caches corresponding to respective channel groups, and wherein each respective channel group comprises at least two memory channels of the plurality of memory channels.

6. The apparatus of claim 1, wherein the respective independent caches correspond to different non-overlapping physical address ranges corresponding to the plurality of memory devices.

7. The apparatus of claim 1, wherein the apparatus is a high performance computing (HPC) data center.

8. The apparatus of claim 1, wherein the plurality of memory devices are low power double data rate (LPDDR) 5 memory devices.

9. The apparatus of claim 1, wherein the memory controller is configured to operate the plurality of channel groups as independent respective reliability, availability, and serviceability (RAS) channels.

10. The apparatus of claim 9, wherein the memory controller is configured to implement one of a chip kill error correction scheme and a RAID error recovery scheme on a per RAS channel basis.

11. A method, comprising:
receiving, at a memory controller, a memory access request;
executing the memory access request by:
based on an address corresponding to the memory access request, determining a particular cache of a plurality of caches of the memory controller to which the address corresponds, wherein:
the plurality of caches correspond to respective channel groups with each channel group comprising a respective group of memory channels of a plurality of memory channels coupling memory devices to the memory controller; and
the respective channel groups include respective independent error correction circuits respectively and independently configured to detect and/or correct errors in data received via a respective one of the plurality of memory channels; and
accessing memory devices of corresponding memory channels of the channel group to which the particular cache corresponds.

12. The method of claim 11, further comprising accessing, in parallel, the memory devices of corresponding memory channels of the channel group to which the particular cache corresponds.

13. The method of claim 11, further comprising operating the plurality of caches independently.

14. The method of claim 11, wherein executing the memory access request comprises executing a read request.

15. The method of claim 11, wherein executing the memory access request comprises executing a write request.

16. A memory controller, comprising:
a front end portion configured to be coupled to a host via an interface;
a back end portion configured to be coupled to a plurality of memory devices via a plurality of memory channels, wherein the plurality of memory channels are organized as a plurality of channel groups; and
a central portion comprising a plurality of independent caches, wherein;
each cache of the plurality of independent caches corresponds to a different one of the plurality of channel groups; and
the central portion includes, for each respective channel group:
first error circuitry configured to implement error detection/correction across the plurality of memory channels corresponding to the respective channel group; and
second error circuitry configured to implement error detection/correction on a per memory channel basis.

17. The memory controller of claim 16, wherein the interface operates in accordance with a compute express link (CXL) protocol.

18. The memory controller of claim 16, wherein the first error circuitry implements a redundant array of independent disks (RAID) error correction scheme, and wherein the second error circuitry implements an error correcting code (ECC) scheme or a cyclic redundancy check (CRC) scheme.

* * * * *